INVENTORS
ERNST BECKER
KARL NOTZ

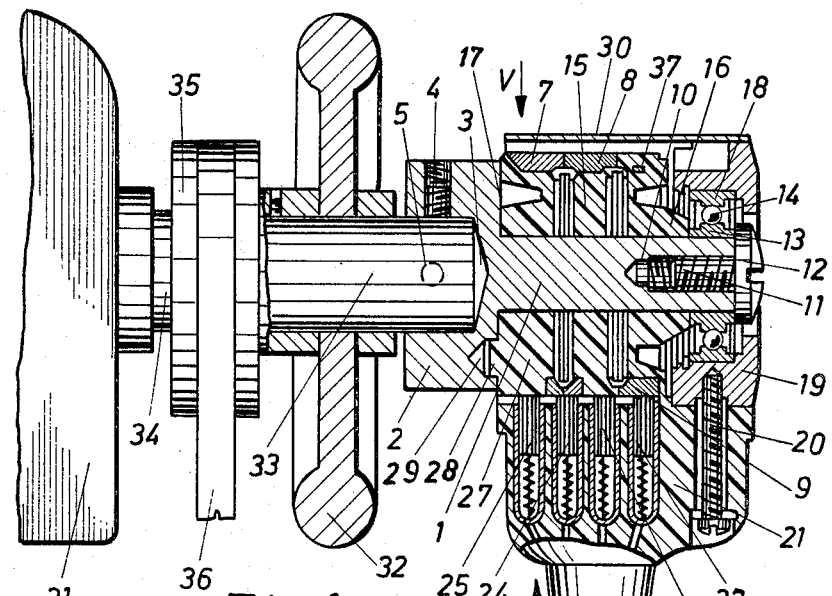
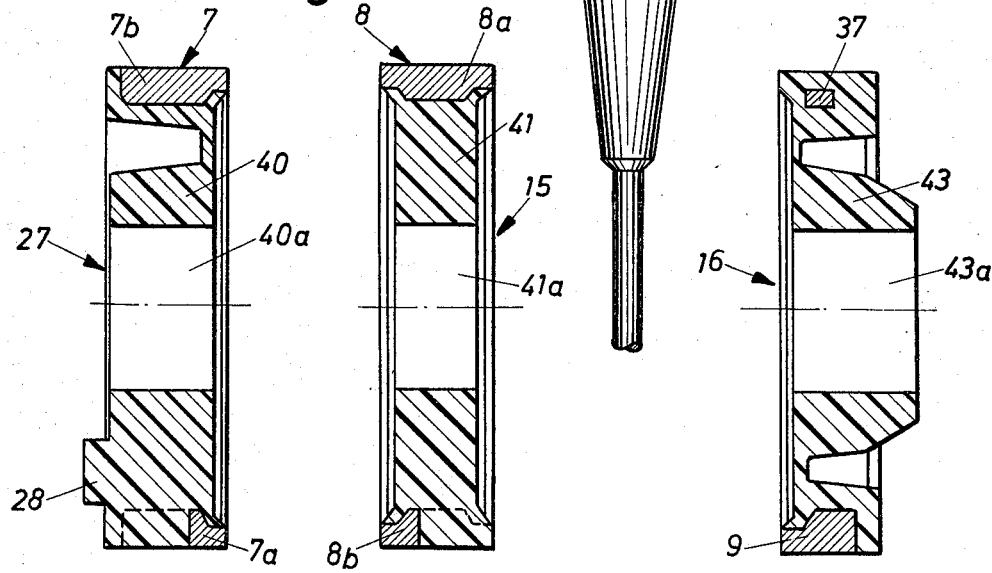
Fig.1  Fig.2  Fig.3  Fig.4

BY Hane and Baxley
ATTORNEYS

United States Patent Office 3,477,399
Patented Nov. 11, 1969

3,477,399
SWITCHING DEVICE FOR A SEWING MACHINE
Ernst Becker, Darmstadt, and Karl Notz, Kulmbach, Germany, assignors to Quick-Rotan Becker & Co., Darmstadt, Germany, a German company
Continuation-in-part of application Ser. No. 542,087, Apr. 12, 1966. This application Feb. 19, 1969, Ser. No. 800,691
Int. Cl. D05b 69/12; H01h 19/00; H01r 39/16
U.S. Cl. 112—219                                 8 Claims

ABSTRACT OF THE DISCLOSURE

A switching device for controlling operation of a sewing machine can be releasably secured to the machine by sliding the drive shaft of the machine into a bore in a shaft of the device. This shaft mounts contact making and breaking commutator rings which are in continuous electric contact with each other and coact with contact brushes mounted in a housing whereby depending upon the angular setting of the commutator rings on the shaft of the device selected circuit connections for operating the machine can be effected with a minimum of commutator rings and brushes coacting therewith.

SPECIFICATION

The present application is a continuation-in-part application based upon our copending application Ser. No. 542,087 filed Apr. 12, 1966 and now abandoned.

The present invention relates to a switching device for controlling the operation of an electrically driven sewing machine, and more particularly, to a switching device of this kind in which several communtator rings, each including a contact interrupting portion, are secured to the handwheel of the machine.

Switching devices of this kind are used for instance, for stopping the machine in a selected needle position; generally the "up" and "down" positions are the desired ones. The commutator rings are necessary to control the needle positions, generally by means of a change-over switch. Additional commutator rings may be provided and similarly operated to control further operations of the machine or accessories therefor.

BACKGROUND

Switching devices of the general kind herein referred to as heretofore known are generally quite complex and adjustment of the commutator rings to desired angular positions required to effect the desired operations is often difficult.

THE INVENTION

It is a broad object of the invention to provide a novel and improved switching device of the general kind above referred to in which the number of the commutator rings and thus the number of controllable operations of the machine can be readily varied and angular adjustment of the rings or exchange thereof can be easily effected.

A more specific object of the invention is to provide a switching device which is of simple and inexpensive construction and can be attached to the sewing machine or detached therefrom without requiring technical skill or special tools.

The aforepointed out objects, features and advantages of the invention, and other objects, features and advantages which will be pointed out hereinafter, are obtained by mounting the commutator rings in side-by-side relationship and in continuous electric contact with each other on a shaft which in turn is suitably coupled to a drive shaft of the sewing machine, and more specifically to the drive shaft extending from the handwheel of the machine. The commutator rings are held in selected angular positions with reference to each other by sutiable clamping means. The commutator rings coact with contact brushes to effect selected circuit connections for operating the machine, as will be more fully explained hereinafter.

According to a preferred embodiment of the invention, the shaft of the device comprises an inner bore which is engageable with and releasably secured to a drive shaft of the machine extending from the handwheel thereof. The bore in the shaft of the device has preferably a diameter of ⅞". This has the advantage that a standard machine drive shaft, that is, a shaft having a diameter of ⅞" may be used. The number and configuration of the commutator rings of the device can be conveniently changed by simply detaching the shaft of the device from the drive shaft of the machine and replacing it by another shaft which carries the desired number of and type of commutator rings.

The invention also provides that each of the commutator rings comprises an insulation ring, the bore of which fits the shaft of the device. The contact portions of the commutator rings are suitably secured upon the surface of the insulation ring, preferably by embedding the contact material in the insulation material by a suitable and conventional molding operation. The angular positions of the rings on the shaft of the device can be readily adjusted by loosening and retightening screw means clamping all rings in position. To facilitate placement of the rings in the desired angular positions with reference to each other, one of the rings if preferably directly locked to the shaft of the device while the other rings are freely slidable and are locked in position only by tightening of the aforementioned screw means.

A still further aspect of the invention is that the outer cage of a ball bearing for the shaft of the machine is mounted in a casing accommodating the brushes. This casing may be used to support a protective cover for the commutator rings. After removal of this cover the rings may be easily cleaned, thereby greatly facilitating the servicing of the device.

In the accompanying drawing, a preferred embodiment of the invention is shown by way of illustration and not by way of limitation.

In the drawing:

FIG. 1 is a lengthwise seectional view of a switching device according to the invention mounted on a drive shaft of a sewing machine;

FIG. 2 is a sectional view of one of the contact making and breaking commutator rings of the device on an enlarged scale;

FIG. 3 is a similar sectional view of a second commutator ring;

FIG. 4 is a similar sectional view of a third commutator ring;

Figure 5:
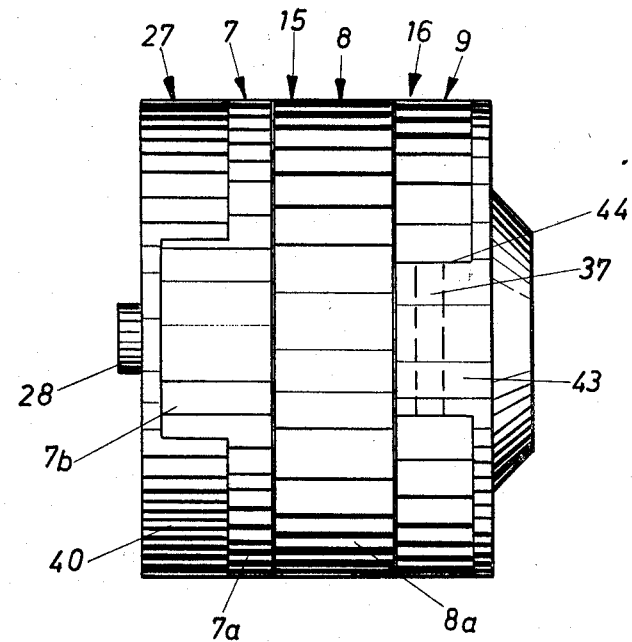
FIG. 5 is a combined view of the three commutator rings seen in the direction of arrow V of FIG. 1.

Turning now to the figures in detail:

The exemplified switching device comprises a shaft 1 which is widened at its lefthand end by a flange 2 including an axial bore 3 for detachably fitting the device upon a suitable shaft 33 of a sewing machine indicated at 31. As stated before, the standard diameter of such sewing machine shafts is ⅞" and accordingly, the diameter of bore 3 is preferably such that it fits a standard shaft. Only those parts of the machine are shown which are essential for the understanding of the invention, and in particular those parts which are helpful for understanding the coaction of the switching device with the sewing machine.

The sewing machine itself should be visualized as being a conventional motor driven machine.

Shaft 33 mounts a handwheel 32 and is continued by a shaft 34 mounting a pulley 35 driven by a belt 36. The belt itself should be visualized as being coupled to the drive shaft of the motor (not shown) of the machine. The switching device is axially and angularly secured on shaft 3 by one or more circumferentially spaced set screws 4 engageable with bores 5 in shaft 3.

Turning now to the description of the switching device proper, the device comprises a plurality of commutator rings, a first ring 27, a second ring 15 and a third ring 16 being shown.

Ring 27 comprises an insulation ring 40 having a center bore 40a which fits shaft 1 of the device. A contact member 7 is suitably fastened upon the outer periphery of the ring, preferably by embedding the contact material in the insulation material, for instance, by a molding process. The contact member has a narrow first contact portion 7a completely encompassing the circumference of the insulation ring, and a second contact portion 7b laterally extending from the first contact portion. The second contact portion encompasses only a fraction of the circumference of insulation ring 40, such as about 65°, as it is clearly shown in FIG. 5.

Figure 6:
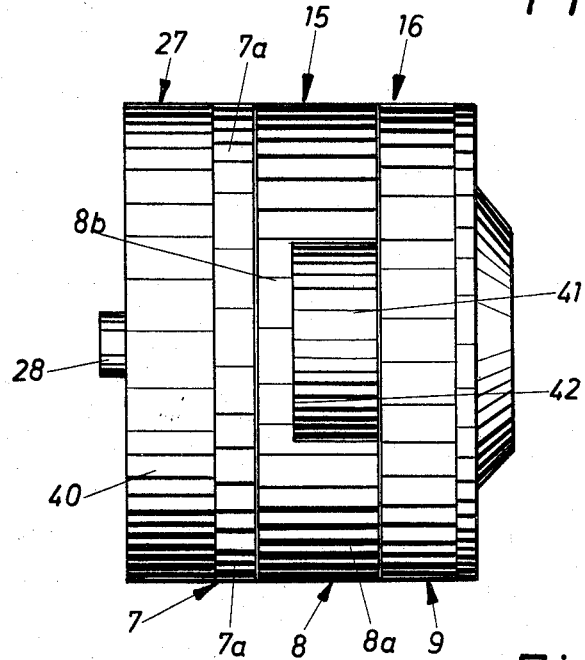
FIG. 6 is a similar combined view of the commutator rings seen in the direction of arrow VI of FIG. 1.

The second contact ring 15 comprises an insulation ring 41 having a center bore 41a fitting shaft 1. A contact member 8 is fitted upon the periphery of the insulation ring in the manner described for contact member 7. As can best be seen in FIG. 6, contact member 8 has a first contact portion 8a encompassing the entire circumference of ring 41 and fitting the width thereof except for a cut-out 42 defining a narrow second contact portion 8b. The wide portion 8a of the contact member extends preferably through an angle of about 295°.

The third commutator ring 16 comprises an insulation ring 43 having a center bore 43a which fits shaft 1. A contact member 9 is secured upon ring 43, as has been described for contact member 7. The contact member encompasses the circumference of ring 43 except for a gap 44 preferably extending through an angle of about 55°. As contact member 9 is interrupted, it is advisable to strengthen the retention thereof on ring 43 by a metal bar or bridge 37 joined to the ends of contact member 9 and fully embedded in the insulation material, as can be seen in FIGS. 1, 4 and 5.

All three rings are fitted upon shaft 1 freely axially and rotatably displaceable thereon to facilitate exchange and setting of the rings, as will be more fully described hereinafter. However, commutator ring 27 after being turned into a predetermined angular position, is secured in such position on the shaft by means of a lug 28 extending from insulation ring 40, preferably integral therewith and engaging a recess 29 in a side wall 17 of flange 2.

Shaft 1 and the commutator rings thereon are rotatably supported in a housing part 19. A bearing such as ball bearing 14 is interposed between the shaft and the housing part. This bearing has an outer bearing ring 18 which is secured to housing part 19 and an inner bearing ring 13 which is pressed by a head 12 of a screw 11 screwed into a bore in the right-hand end of shaft 1 against adjacent commutator ring 16. Screw 11 and its head constitute in effect an axial thrust means, the tightening of which presses the three commutator rings against each other and flange 2. As a result, all three commutator rings 27, 15 and 16 are now secured on shaft 1 in the selected angular positions with reference one to another. Moreover, the contact members of all three rings are maintained in continuous electric contact with each other along the adjacent edges of the contact members, as it clearly shown in FIGS. 5 and 6.

Housing part 19 serves as a support for a detachably mounted protective cover 30 and also as a support for a brush holder 21 secured to housing part 19 by suitable fastening means such as one or more screws 20.

Brush holder 21 accommodates four spring-loaded brushes 22, 23, 24 and 25 which are connected by a four-wire cable 26 to a sewing machine motor (not shown) for controlling the operation of the machine. A change-over switch of conventional design (not shown) may be visualized as being included in cable 26 to connect the brushes in circuit as required.

As is best shown in FIG. 1, brush 24 is always in engagement with contact portions 7a and 8a of contact members 7 and 8 respectively on commutator rings 27 and 15. This brush should also be visualized as being continuously connected to the motor via the change-over switch. Brush 24 coacts with the laterally enlarged contact portion 7b of contact member 7 on commutator ring 27 and brush 23 coacts with the wide contact portion 8b of contact member 8 on commutator ring 15. Contact brush 22 coacts with interrupted contact member 9 on commutator ring 16. Contact brushes 22, 23 and 25 should be visualized as being arranged to be alternatively and selectively connectable to the motor by operating the change-over switch.

As is now evident, an energizing circuit for the motor is closed when brush 25 is connected to the motor and is in engagement with contact portion 7b of contact member 7 of commutator ring 27. Another energizing circuit for the motor is closed when brush 23 is connected to the motor and is in contact engagement with the enlarged contact portion 8d of contact member 8 on commutator ring 15. By assigning one of the brushes 25 and 23 to the upper needle position and the other brush to the lower needle position of the sewing machine, starting and stopping of the motor at the assigned positions can be conveniently controlled. Moreover, timing of the motor control can be conveniently and accurately adjusted by varying the angular position of commutator ring 15 with reference to the commutator ring 27 after loosening screw 11. Further adjustments can be obtained by varying the circumferential lengths of the enlarged contact portions such as contact portion 7b, by exchanging the commutator rings assembled on shaft 1 as previously described.

The third commutator ring 16 may be used to control an accessory of the sewing machine, such as a cutter. For this purpose, brush 22 coacting with contact member 9 is connected via the change-over switch to the motor. As is evident, engagement between brush 22 and contact member 9 closes the motor circuit via brushes 24 and 22 when and while brush 22 is in its contact making position.

Additional commutator rings arranged to be in continuous contact with the other commutator rings in the manner previously described and brushes associated with such additional commutator rings can be readily provided for independently controlling more than one accessory.

What is claimed is:

1. In combination with a sewing machine having a drive shaft, a rotary switching device for coaction with said drive shaft to control operations of the machine, said switching device comprising in combination:
 a shaft including means for releasably securing said shaft to the drive shaft of the sewing machine for joint rotation therewith;
 a plurality of circuit making and breaking commutator rings, each including an insulation ring, a first and a second one of said commutator rings having secured upon its insulation ring a contact member including a first contact portion encompassing the entire circumference of the respective insulation ring but only part of the width thereof and a second contact portion extending laterally from the first contact portion and encompassing only part of the circumference of the respective insulation ring, and a third commutator ring having secured upon its insulation ring a contact member encompassing only part of the circumference of its insulation ring;
 said commutator rings being rotatably and axially slidably seated on said shaft in side-by-side relationship in which the contact members of each two adjacent commutator rings are flush with one edge of the respective ring whereby the members are in continuous electrically conducting engagement with each other;

a stationary housing, said shaft of the device and said commutator rings thereon being rotatably supported in said housing;

axial thrust means for releasably pressing said commutator rings against one another to secure said rings in selected axial and angular positions with reference to the shaft of the device; and a plurality of contact brushes mounted in said housing, one of said brushes (24) being in continuous contact with the first contact portion of the first and the second commutator ring, a second contact brush (25) disposed to engage with the second contact portion of the first commutator ring, a third contact brush (23) disposed to engage with the second contact portion of the second commutator ring, and a fourth brush (22) disposed to engage with the contact member on the third commutator ring.

2. The switching device according to claim 1 wherein the circumferential edges of the first contact portion of the contact member on the second commutator ring are in continuous electric contact with the adjacent circumferential edge of the first contact portion of the contact member on the first commutator ring and with the adjacent circumferential edge of the contact member on the third commutator ring.

3. The switching device according to claim 1 wherein a bar embedded in the insulation ring of the third commutator ring mechanically joins the ends of the contact member thereon.

4. The switching device according to claim 1 wherein said means for securing the shaft of the device to the sewing machine shaft comprises a bore formed in an end face of the shaft of said device for receiving therein the sewing machine drive shaft, and set screw means for securing said shafts in a predetermined angular position with reference to each other.

5. The switching device according to claim 1 and comprising fastening means for releasably securing an outer one of said commutator rings in a fixed axial and angular position with reference to said shaft of the device.

6. The switching device according to claim 5 wherein said fastening means for securing said outer commutator ring on the shaft comprises a flange on the shaft of the device, said flange and said outer ring including a recess and a protrusion respectively engageable with each other.

7. The switching device according to claim 5 wherein said axial thrust means comprise a screw means positioned in the other end face of the shaft of the device and engageable with the other outer one of said commutator rings to press said ring and the intermediate commutator rings toward said secured commutator ring by tightening said screw means.

8. The switching device according to claim 7 and comprising a bearing having an outer bearing ring and an inner bearing ring interposed between the shaft of the device and the housing, the outer bearing ring being secured to the housing and the inner bearing ring being secured between said screw means and said other outer commutator ring for transmitting axial thrust from said screw means to said ring.

References Cited

UNITED STATES PATENTS

| | | | |
|---|---|---|---|
| 2,520,709 | 8/1950 | Bitler | 310—235 XR |
| 2,749,397 | 6/1956 | Brown | 200—26 |
| 2,961,591 | 11/1960 | Frankel et al. | |
| 3,078,356 | 2/1963 | Friedman et al. | 200—26 XR |
| 3,182,140 | 5/1965 | Parker | 200—26 XR |
| 3,204,592 | 9/1965 | De Jong. | |

H. HAMPTON HUNTER, Primary Examiner

U.S. Cl. X.R.

200—26, 28; 310—235